March 15, 1960  R. E. SMUCKER ET AL  2,928,125
METHOD OF AND INJECTION NOZZLE FOR PREVENTING
EXCESSIVE HEAT TRANSFER TO A MOLD
Filed May 31, 1956
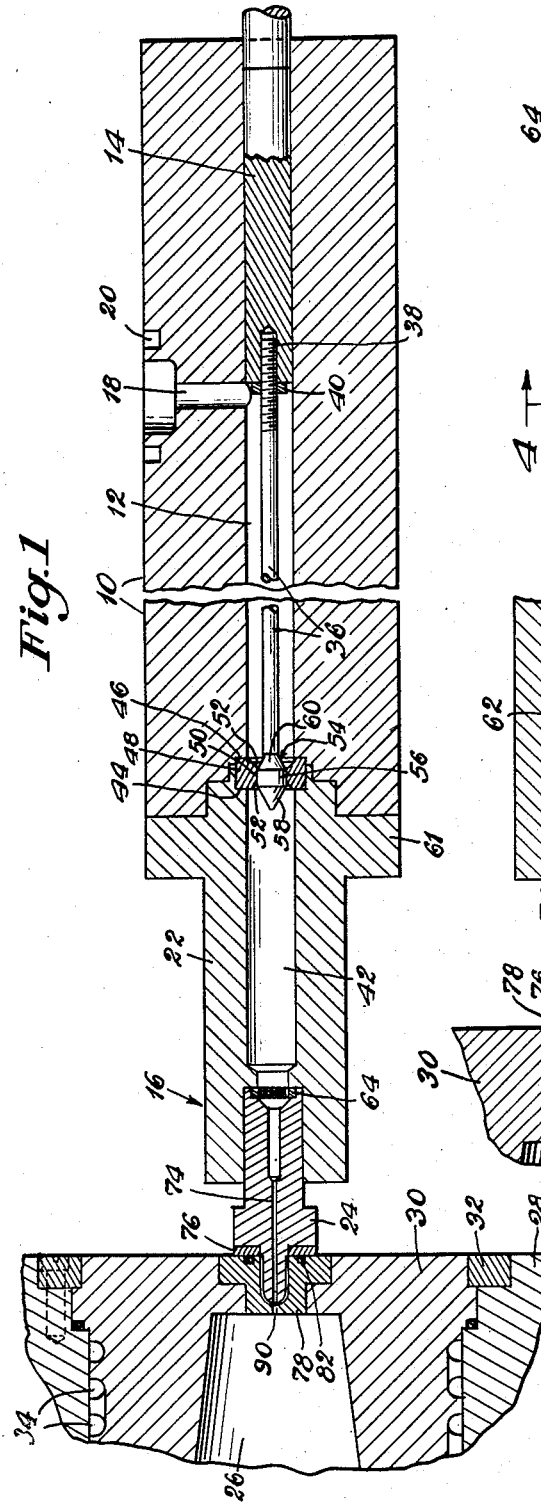
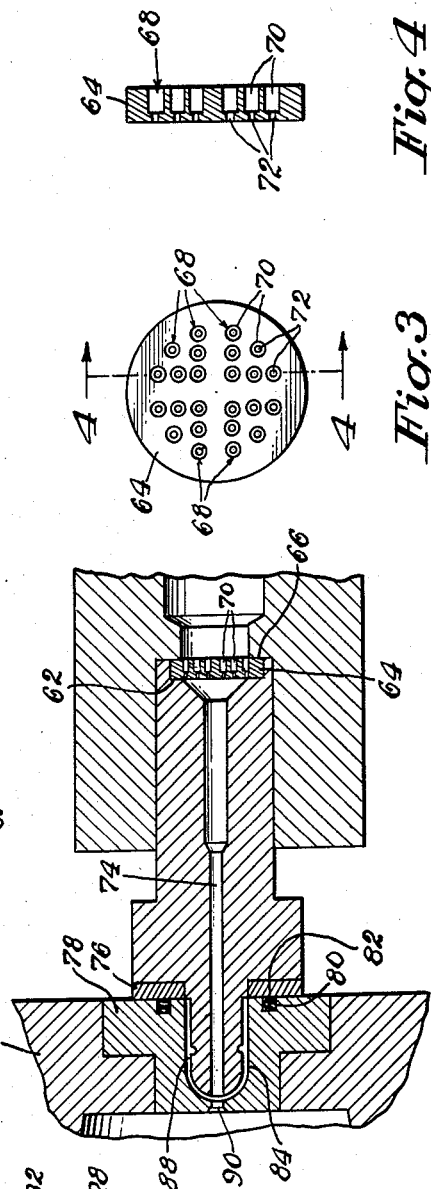
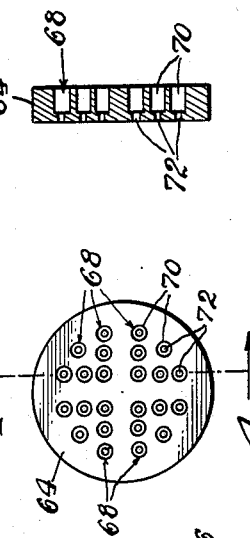
Inventor
Robert E. Smucker
James M. Harrison
by Parker & Carter
Attorneys United States Patent Office
2,928,125
Patented Mar. 15, 1960

2,928,125

METHOD OF AND INJECTION NOZZLE FOR PREVENTING EXCESSIVE HEAT TRANSFER TO A MOLD

Robert E. Smucker and James M. Harrison, Fort Worth, Tex., assignors to Crown Machine and Tool Company, Fort Worth, Tex., a corporation of Texas Application May 31, 1956, Serial No. 588,477

8 Claims. (Cl. 18—30)

This invention is in the field of injection equipment and is in the nature of an injection cylinder and nozzle arrangement to prevent leakage and plugging.

A primary object of this invention is an injection cylinder with a pin gate nozzle, for example 1/8 inch, with a strainer to prevent plugging by foreign matter.

Another object is a floating connection between the nozzle and its bushing in the cavity platen.

Other objects will appear from time to time in the ensuing specification and drawings in which:

Figure 1 is a side section of the injection cylinder structure with a mold;

Figure 2 is a side section of the nozzle tip structure, on an enlarged scale;

Figure 3 is a front view of the strainer; and

Figure 4 is a section along line 4—4 of Figure 3.

In Figure 1 an injection cylinder housing, indicated generally at 10, has a central bore or passage 12 for an injection ram 14 which is reciprocated in the usual manner, by a suitable hydraulic cylinder or otherwise to force molten plastic from the bore through a nozzle structure indicated generally at 16. The cylinder housing is normally mounted under a preplasticizer, not shown, which feeds liquid plastic to a suitable inlet passage 18 opening into the bore. The inlet passage may be provided with a groove or the like 20 for an O ring seal or otherwise.

The nozzle structure includes a nozzle housing 22 and a nozzle tip 24 which will be described in detail later. The liquid plastic is injected into a cavity 26 in a suitable cavity platen 28 which carries a cavity mold 30 or the like held in place by a suitable retaining ring 32 and controlled in temperature, as desired, by a suitable water coursing arrangement 34.

To prevent leakage between shots, an internal valve structure is provided which includes a valve rod 36 threaded at 38 into the front face of the ram and held in place by a suitable lock nut 40 or the like after adjustment. The bore 42 of the nozzle housing is shouldered at 44 as is the bore of the injection cylinder housing at 46 to hold a bushing or annular valve seat 48 concentrically in the bore. This valve seat has a central passage or valve opening 50, which may be cylindrical and tapered or conical on each edge at 52 for cooperation with a valve head 54 on the rod which has a similar cylindrical portion 56 approximately the same diameter as the opening 50, but naturally slightly smaller, with tapered or conical portions 58 and 60 on each side. The nozzle housing may be suitably flanged at 61 and tightly held on the cylinder housing with suitable sealing means in any known manner.

The nozzle tip slips into the forward face of the nozzle housing and is shouldered at 62 to provide a tight seat for a strainer 64 against a similar shoulder 66 on the nozzle housing. The strainer is an insert and disc shaped with a plurality of passages 68, arranged in any suitable pattern, each having an enlarged portion 70 on its inlet side, and a reduced portion or pinhole 72 on its outlet side. The nozzle tip may be held in the housing in any suitable manner, and the aligned bores or passages in the various elements may be reduced in any number of steps down to a pinhole or gate 74 in the tip, for example approximately 1/8 inch. The forward face of the nozzle carries a steel plate or disc 76 which may be silver soldered or otherwise held in any suitable manner to engage the bushing 78 in the cavity mold. The bushing is grooved at 80 and carries silicon O ring seal or the like 82 which cooperates with the steel disc on the front of the nozzle tip. The recess 84 in the bushing cooperates with the end 86 of the nozzle, and the parts are constructed so that a slight spacing or clearance exists at 88, and the pinhole 90 through the bushing is aligned with the pin gate 74 in the nozzle tip.

The use, operation and function of this invention are as follows:

An injection cylinder arrangement which reduces leakage to an absolute minimum is provided. Between injection shots when the ram is withdrawn, some valving arrangement is necessary to prevent the liquid plastic from dribbling out of the nozzle tip. This has normally been done by a rotary or slide valve actuated and controlled by a separate hydraulic cylinder or the like from outside the injection cylinder housing. But this involved additional passages, seals and various moving parts in the cylinder, all of which cause leaks regardless of how effective the seals are.

To prevent this a valve structure which is totally contained within the injection cylinder and has no parts going through the walls of the cylinder is provided. The seat of this valve is an annular bushing or the like concentric and aligned with the bore of the cylinder and having an accurately machined cylindrical surface which functions as a valve seat. This bushing may be held between two cooperating parts, such as, the injection cylinder house and the nozzle house, and leakage is completely eliminated.

A valve rod or the like is mounted on the front of the injection ram and an enlarged head on the rod has a cylindrical portion which functions as a valve with the bushing. The conical portions on each side of the cylindrical portion, both on the valve and on the seat, serve to guide the valve rod when it is moving either onto or off of its seat during normal operation. This type of cut-off valve or its equivalent will prevent outside leakage of material because the valve is operated by the ram and totally contained on the inside.

Additionally, a strainer is provided in the line of plastic flow after the valve. Pin gate injection can be troublesome because foreign matter in the liquid plastic can plug the gate and stop the machine. A small strainer or a sieve between the nozzle tip and the nozzle housing is provided, held between opposed shoulders, so as to be leak-proof, with a suitable number of openings arranged in a suitable pattern each of a smaller size than the hole in the pin gate. Any foreign matter which will pass through the strainer will also go through the gate in the nozzle tip.

The seal and the heat resistant plate between the nozzle tip and the cavity platen substantially reduce wear between these parts. Normally the nozzle and cavity platen are brought together under quite large pressures, and the nozzle tip may be beryllium, copper, brass, or any other suitable high heat transfer material. By this invention a steel plate is provided to resist heat transfer between seal on the front face of the cavity platen and the nozzle tip.

An additional important point is the fact that the nozzle floats in the nozzle bushing 78. The spacing 88 is important. The first shot of plastic will fill, generally, the space 88, which thereafter acts as an effective seal to back up the silicon O ring 80. With this type of seal, misalignment problems between the nozzle and bushing are completely eliminated.

While the preferred form of this invention has been shown and described, it should be understood that numerous modifications, substitutions, alterations and changes can be made without departing from the invention's fundamental theme. It is, therefore, wished that the invention be unrestricted except as by the appended claims.

We claim:

1. In an injection mechanism for molding plastic and the like, an injection mold having a recess in communication with the mold cavity, and an injection device for delivering molding material to the mold, said injection device including a nozzle assembly in abutting engagement with the mold to thereby prevent leakage at the nozzle assembly-mold junction, said nozzle assembly having a projecting tip which fits into the recess in the mold, the projecting tip being spaced from the surface of the recess to form a floating mounting between the mold and tip.

2. The structure of claim 1 in which the nozzle assembly has a front face around the tip opposed to the mold, and further including a heat resistant barrier between the mold and front face of the nozzle assembly.

3. The structure of claim 2 in which the barrier includes a silicon O ring seal.

4. In a plastic molding machine or the like, a nozzle in abutting engagement with a mold adjacent its forward end and an injection device at its rearward end, said nozzle having an opening therethrough for the passage of molding material, said mold having a recess for the reception of the nozzle, said recess communicating with the interior of the mold, said nozzle being spaced from the surface of the recess at all points to thereby form an insulating space between the nozzle and the mold.

5. A plastic molding machine nozzle-mold assembly for preventing excessive heat transfer from the nozzle to the mold including a nozzle having a rearward end adapted for communication with an injection device and a forward end adapted for operative engagement with the mold, said nozzle having a rearwardly extending portion terminating in a wear resistant shoulder adapted for abutting engagement with the mold, the mold having a surface opposed to the wear resistant shoulder on the nozzle and a recess slightly larger than the nozzle so that when said nozzle is positioned within the recess an air space is formed between the nozzle and recess at least at the forward most end of the nozzle.

6. An insulating nozzle-mold structure for a plastic molding machine or the like including a nozzle structure having a rearward end adapted for communication with the injection cylinder of a plastic molding machine or the like and a forward end adapted for operative engagement with a mold, said forward end being a nozzle tip having a substantially smooth end surface contour and an elongated rearward extending portion, said rearward extending portion terminating in a shoulder having a wear resistant surface adapted for abutting engagement with a mold, a mold having a surface adapted for engagement with the wear resistant surface on the nozzle structure and a recess slightly larger than the nozzle tip so that when said tip is in position within the recess there is an air space between the tip and recess at least at the forwardmost end of the tip, the recess being larger than the nozzle tip along substantially the entire elongated portion of the tip.

7. A method of preventing excessive heat transfer between a mold and a nozzle of a plastic molding machine or the like including the steps of forming a void space at least between the end of the nozzle and the mold, filling the void with the plastic being molded at the commencement of molding operations, permitting the plastic to solidify, and maintaining the solidified plastic between the nozzle and mold throughout the molding operations.

8. A method of preventing excessive heat transfer between a mold and a nozzle of a plastic molding machine including the steps of forming an insulating layer of the plastic being molded about the nozzle at the commencement of molding operations, and maintaining the plastic insulating layer between the nozzle and mold throughout the molding operations.

References Cited in the file of this patent

UNITED STATES PATENTS

| | | |
|---|---|---|
| 2,345,917 | Coffman | Apr. 4, 1944 |
| 2,431,349 | Stacy | Nov. 25, 1947 |
| 2,514,390 | Hagen | July 11, 1950 |
| 2,814,831 | McKee | Dec. 3, 1957 |